UNITED STATES PATENT OFFICE

2,154,926

DYESTUFFS OF THE TRIARYLMETHANE SERIES

Paul Herbert Wolff, Frankfort-on-the-Main-Hochst, Friedrich Heim, Sindlingen, and Carl Winter and Ludwig Bettag, Ludwigshafen-on-the-Rhine, Germany, assignors to General Aniline Works, Inc., New York, N. Y., a corporation of Delaware No Drawing. Application September 15, 1937, Serial No. 163,960. In Germany September 28, 1933

4 Claims. (Cl. 260—319)

The present invention relates to new dyestuffs of the triarylmethane series and a process of producing same. The present application is a continuation in part of our copending application Ser. No. 76,258, filed April 4, 1936.

We have found that new valuable dyestuffs of the triarylmethane series having very favorable properties as regards fastness, especially excellent fastness to light, are obtained by condensing a beta-beta'-di-indolylketone of the following formula

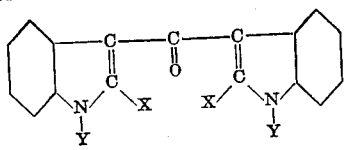

wherein X represents a member of the group consisting of methyl and phenyl and Y represents a member of the group consisting of hydrogen and alkyl with a secondary or a tertiary diphenylamine of the following formula:

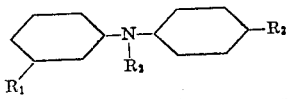

wherein $R_1$ represents a member selected from the group consisting of hydrogen, methyl, alkoxy and aralkoxy groups, $R_2$ represents a member of the group consisting of hydrogen and alkyl and $R_3$ represents a substituent of the group consisting of methyl, alkoxy and aralkoxy groups.

For the production of the said dyestuffs the beta-beta'-di-indolyl-ketone may at first be converted into a ketone chloride-like compound by means of phosphorus oxychloride, the said compound then being condensed with the diphenylamine giving the dyestuff. The two reactions may also be carried out in one working operation whereby the formation of the ketone chloride-like compound of the beta-beta'-di-indolylketone is effected in the presence of the secondary or tertiary diphenylamine. In this case the formation of the dyestuff by the condensation of the diphenylamine with the ketone chloride-like compound takes place in a speed depending on the formation of the ketone chloride-like compound. It is also possible to prepare the ketone chloride of the beta-beta'-di-indolylketone in a separate operation by causing phosgene to act on a suspension of the beta-beta'-di-indolylketone in boiling benzene. The ketone chloride is then condensed with the secondary or tertiary diphenylamine preferably in the presence of a condensing agent, for example an anhydrous metal halide such as zinc chloride or aluminium chloride. The resulting basic dyestuffs may be aftertreated with sulphonating agents such as concentrated sulphuric acid.

The beta-beta'-di-indolylketones serving as starting materials for the purpose of the present invention may be obtained from indoles substituted in alpha-position, or from N- and alpha-substituted indoles by causing phosgene to act thereon in the presence of benzene at room temperature or while slowly heating. The reaction products are stirred with dilute aqueous ammonia and the beta-beta'-di-indolylketones separated are filtered off by suction, washed and dried.

The secondary or tertiary diphenylamines employed in the present process must have a free 4-position but they may be substituted in the 4'-position or also in the 3-position by alkyl-, alkoxy or aralkoxy groups.

The reaction proceeds for example according to the following equation:

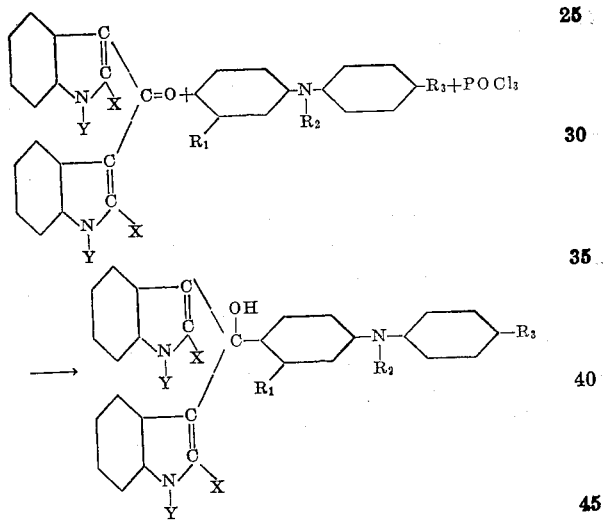

wherein X represents methyl or phenyl, Y hydrogen or alkyl, $R_1$ hydrogen, methyl, alkoxy and aralkoxy, $R_2$ hydrogen or alkyl groups and $R_3$ methyl, alkoxy or aralkoxy groups.

The sulphonated dyestuffs are well suitable for dyeing wool and silk. The dyestuffs free from sulphonic groups may be used, for example, for coloring cellulose ester lacquers.

The following examples will further illustrate how our said invention may be carried out in practice but the invention is not restricted to these examples. The parts are by weight.

Example 1

A mixture of 44 parts of beta-beta'-di-(N-methyl-alpha-phenylindolyl)-ketone, 35 parts of tetrachlorethane and 16.4 parts of phosphorus oxychloride is stirred for an hour at 90° C. Then 25.7 parts of 4,3'-diethoxydiphenylamine are added. The formation of the dyestuff is effected by heating the mixture at about 100° C. for 20 hours. The melt is then treated with hot water and the tetrachlorethane is removed by steam distillation. The residue is stirred with xylene and the dyestuff thus remaining is filtered off by suction and dried.

30 parts of the basic dyestuff thus obtained are then introduced while stirring into 100 parts of sulphuric acid of 90 per cent strength and then converted into the disulphonic acid by the addition of sulphuric acid monohydrate. The mixture is poured onto ice and the dyestuff separated is filtered off and dried. It dyes wool and silk blue shades of excellent fastness to light. The dyestuff corresponds to the formula:

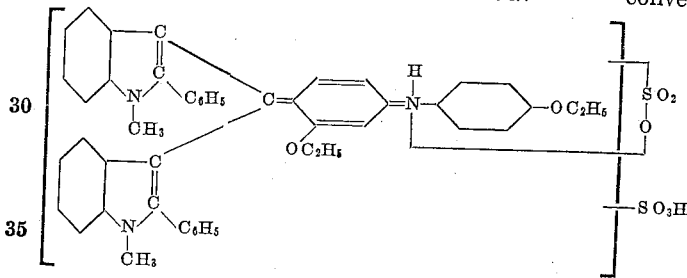

Similar dyestuffs giving blue dyeings on wool and silk and having similar good fastness to light are obtained if instead of 4,3'-diethoxydiphenylamine 4-methoxy-3'-ethoxydiphenylamine, 4-methyl-3'-benzylhydroxydiphenylamine or 4-benzylhydroxydiphenylamine are employed.

Example 2

A mixture of 44 parts of beta-beta'-di(N-methyl-alpha-phenylindolyl)-ketone, 44 parts of toluene, 22.7 parts of 4-methyl-3'-ethoxydiphenylamine and 16.4 parts of phosphorus oxychloride is heated at 100° C. for 8 hours while stirring. After working up and sulphonating in the manner described in Example 1 a dyestuff is obtained which dyes wool and silk blue shades of excellent fastness to light. The shades are a little more reddish than those obtained with the dyestuff described in Example 1.

Example 3

24.8 parts of the ketone chloride of beta-beta'-di(N-methyl-alpha-phenylindolyl)-ketone (obtainable by treating a suspension of beta-beta'-di-(N-methyl-alpha-phenylindolyl)-ketone in boiling benzene with an excess of phosgene) are condensed with 10.7 parts of 4-ethoxydiphenylamine in the presence of 35 parts of tetrachlorethane and 7 parts of anhydrous zinc chloride by heating at about 100° C. and stirring for 24 hours. The dyestuff is isolated and converted into its disulphonic acid in the manner described in Example 1. It dyes wool and silk blue shades of excellent fastness properties.

Example 4

A mixture of 44 parts of beta-beta'-di(N-methyl-alpha-phenylindolyl)-ketone, 44 parts of toluene, 22.7 parts of 4-ethoxy-3'-methyldiphenylamine and 16.4 parts of phosphorus oxychloride is stirred at about 100° C. for 24 hours. After working up and sulphonating in the manner described in Example 1 a dyestuff is obtained giving on wool and silk blue shades of excellent fastness to light.

Example 5

A mixture of 44 parts of beta-beta'-di(methyl-alpha-phenylindolyl)-ketone, 44 parts of toluene, 22.7 parts of N-methyl-4-ethoxydiphenylamine and 16.4 parts of phosphorus oxychloride is stirred at about 100° C. for 24 hours. After working up and converting it into its disulphonic acid in the manner described in Example 1 a dyestuff is obtained dyeing wool and silk blue shades of excellent fastness to light.

Example 6

28.8 parts of beta-beta'-di(alpha-methylindolyl)-ketone, 28.8 parts of toluene, 22.7 parts of 4-methyl-3'-ethoxydiphenylamine and 16.4 parts of phosphorus oxychloride are stirred at about 100° C. for 24 hours. The melt is worked up and converted into its disulphonic acid according to the manner described in Example 1. The dyestuff obtained dyes wool and silk red-violet shades of excellent fastness to light.

By employing 4,3'-diethoxydiphenylamine instead of 4-methyl-3'-ethoxydiphenylamine a red-violet dyestuff giving somewhat bluer shades and having similar fastness properties is obtained.

Example 7

A mixture of 40 parts of beta-beta'-di-(N-isobutyl-alpha-methylindolyl)-ketone, 40 parts of toluene, 25.7 parts of 4,3'-diethoxydiphenylamine and 16.4 parts of phosphorus oxychloride is stirred at about 100° C. for 24 hours. After working up and sulphonating in the manner described in Example 1 a dyestuff is obtained giving on wool and silk red-violet shades of excellent fastness to light. The shade is somewhat more reddish than that of the dyestuff described in Example 6.

A similar dyestuff having a red-violet shade and similar good properties is obtained if instead of beta-beta'-di(N-isobutyl-alpha-methylindolyl)-ketone beta-beta'-di(N-omega-cyanethyl-alpha-methylindolyl)-ketone is employed.

Example 8

A mixture of 31.6 parts of beta-beta'-di-(N-methyl-alpha-methylindolyl)-ketone, 31.6 parts of toluene, 25.7 parts of 4,3'-diethoxydiphenylamine and 16.4 parts of phosphorus oxycholride is stirred at about 100° C. for 24 hours. The melt is worked up and converted into its disulphonic acid in the manner described in Example 1. The dyestuff obtained dyes wool and silk red-violet shades of excellent fastness to light.

What we claim is:

1. The process of producing dyestuffs of the triarylmethane series which comprises converting a compound of the general formula

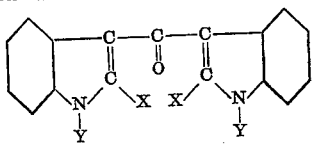

wherein X represents a member of the group consisting of methyl and phenyl and Y represents a member of the group consisting of hydrogen and alkyl into the corresponding ketochloride by means of phosphorus oxychloride substantially in the absence of water and condensing the ketochloride formed with an aromatic amine of the general formula

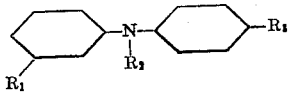

wherein $R_1$ represents a member selected from the group consisting of hydrogen, methyl, alkoxy and aralkoxy groups, $R_2$ represents a member of the group consisting of hydrogen and alkyl and $R_3$ represents a substituent of the group consisting of methyl, alkoxy, and aralkoxy groups and sulphonating the resulting basic dyestuff by treatment with a sulphonating agent.

2. The process of producing dyestuffs of the triarylmethane series which comprises condensing a compound corresponding to the general formula

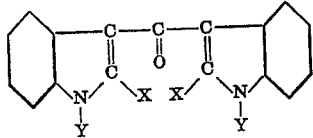

wherein X represents a member of the group consisting of methyl and phenyl and Y represents a member of the group consisting of hydrogen and alkyl by means of phosphorus oxychloride substantially in the absence of water with an aromatic amine of the general formula

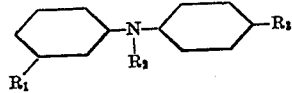

wherein $R_1$ represents a member selected from the group consisting of hydrogen, methyl, alkoxy and aralkoxy groups, $R_2$ represents a member of the group consisting of hydrogen and alkyl and $R_3$ represents a substituent of the group consisting of methyl, alkoxy and aralkoxy groups and sulphonating the resulting basic dyestuff by treatment with a sulphonating agent.

3. Sulphonation products of dyestuffs of the triarylmethane series corresponding to the general formula

wherein each A represents an indolyl radicle, attached to the carbon atom in the beta-position, being substituted in the alpha-position by a substituent of the group consisting of methyl and phenyl and containing attached to the nitrogen atom a member of the group consisting of hydrogen and alkyl, and wherein B represents the radicle of a diphenylamine, attached to the carbon atom in the 4-position, containing in the 3-position a member of the group consisting of hydrogen, methyl, alkoxy and aralkoxy groups and being substituted in the 4'-position by a substituent of the group consisting of methyl, alkoxy and aralkoxy groups.

4. Dyestuffs of the triarylmethane series corresponding to the general formula

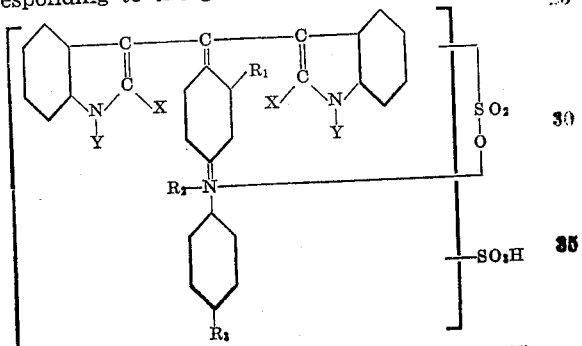

wherein X represents a member of the group consisting of methyl and phenyl and Y represents a member of the group consisting of hydrogen and alkyl and wherein $R_1$ represents a member selected from the group consisting of hydrogen, methyl, alkoxy and aralkoxy groups, $R_2$ represents a member of the group consisting of hydrogen and alkyl and $R_3$ represents a substituent of the group consisting of methyl, alkoxy and aralkoxy groups.

PAUL HERBERT WOLFF.
FRIEDRICH HEIM.
CARL WINTER.
LUDWIG BETTAG.